United States Patent
Byers (10) Patent No.: US 7,387,654 B1
(45) Date of Patent: Jun. 17, 2008

(54) SCREEN ASSEMBLY KIT FOR AN AIR PROCESSING UNIT

(76) Inventor: Thomas L. Byers, 5840 Stewart Dr., Mustang, OK (US) 73064

( * ) Notice: Subject to any disclaimer, the term of this patent is extended or adjusted under 35 U.S.C. 154(b) by 423 days.

(21) Appl. No.: 10/977,052

(22) Filed: Oct. 29, 2004

Related U.S. Application Data (63) Continuation-in-part of application No. 10/887,703, filed on Jul. 9, 2004, now abandoned.

(51) Int. Cl.
*B01D 46/10* (2006.01)

(52) U.S. Cl. ............... 55/385.1; 55/496; 55/500; 55/502; 55/511; 55/525; 55/490; 55/491; 55/495; 55/501; 55/DIG. 31; 62/259.1; 62/262; 62/507

(58) Field of Classification Search ............ 55/385.1, 55/496, 500, 511, 525, 490, 491, 495, 501, 55/DIG. 31, 502; 62/259.1, 507, 262
See application file for complete search history.

(56) References Cited

U.S. PATENT DOCUMENTS

| | | | |
|---|---|---|---|
| 1,909,173 A | 5/1933 | Gilhool | |
| 2,705,990 A | 4/1955 | Miller | |
| 3,320,996 A | 5/1967 | Singer | |
| 3,436,889 A | 4/1969 | Jessee | |
| 4,745,769 A | 5/1988 | Wooden, Jr. | |
| 4,961,849 A * | 10/1990 | Hull et al. | 210/232 |
| 5,097,678 A * | 3/1992 | Aubuchon | 62/506 |
| 5,131,463 A | 7/1992 | Zimmerli et al. | |
| 5,156,662 A * | 10/1992 | Downing et al. | 55/493 |
| 5,307,849 A | 5/1994 | Nelson | |
| 5,312,467 A | 5/1994 | Wolfe | |
| 5,529,593 A | 6/1996 | Simmons | |
| 5,687,689 A * | 11/1997 | Santos | 123/198 E |
| 5,809,800 A * | 9/1998 | Deal | 62/507 |
| 6,138,993 A | 10/2000 | Mitchell, Jr. et al. | |
| 6,221,120 B1 | 4/2001 | Bennington et al. | |

* cited by examiner

*Primary Examiner*—Duane Smith
*Assistant Examiner*—Minh-Chau T. Pham
(74) *Attorney, Agent, or Firm*—Fellers, Snider, et al.

(57) ABSTRACT

A screen assembly, associated kit and method of forming the same. The screen assembly is adapted to filter intake air passing through an exterior surface of an air processing unit, and includes a substantially rectilinear screen mesh having opposing top and bottom edges, opposing proximal and distal edges, and top and bottom contact surfaces which laterally extend along the respective extents of the top and bottom edges. The screen mesh is formed from a plurality of transversely aligned, spaced apart filaments arranged to filter contaminants from the inlet air. Opposing first and second attachment members respectively secure the proximal and distal edges to the exterior surface so as to apply a tension force to the screen mesh which seals the top and bottom contact surfaces in direct contacting abutment against the exterior surface, thereby eliminating the need for one or more mechanical fasteners along the top and bottom edges.

46 Claims, 8 Drawing Sheets

SCREEN ASSEMBLY KIT FOR AN AIR PROCESSING UNIT

RELATED APPLICATIONS

This application is a continuation in part of U.S. patent application Ser. No. 10/887,703 filed Jul. 9, 2004 now abandoned.

FIELD OF THE INVENTION

The claimed invention relates generally to the field of air processing units and more particularly, but not by way of limitation, to a screen assembly which attaches to an exterior surface of an air processing unit to restrict the ingress of airborne particulates.

BACKGROUND

Residential and commercial heating, ventilation and cooling (HVAC) systems often employ air processing units, such as an air conditioning compressor unit or a heat pump, that are located outdoors. Such an air processing unit is typically configured to exchange heat with the surrounding ambient air and can include a number of coils through which a compressed fluid is directed.

Closely spaced cooling fins are often placed adjacent the coils to facilitate the heat transfer, and a fan is often used to direct an air flow through the fins and adjacent the coils. Since the assemblies are located outdoors, it is common for dirt and other debris to collect on and between the fins and coils over time, reducing the effectiveness of the air processing units.

While a number of prior art solutions have been proposed in an attempt to prevent or reduce the collection of such particulate debris, there nevertheless remains a continual need for improvements in the art that are easily and inexpensively manufactured and installed, as well as adaptable to a number of different sizes and shapes of air processing units. It is to these and other such improvements that the present invention is generally directed.

SUMMARY OF THE INVENTION

Preferred embodiments of the present invention are generally directed to a screen assembly, an associated kit and a method of forming the same.

The screen assembly is adapted to filter intake air passing through an exterior surface of an air processing unit, and includes a substantially rectilinear screen mesh having opposing top and bottom edges, opposing proximal and distal edges, and top and bottom contact surfaces which laterally extend along the respective extents of the top and bottom edges. The screen mesh is formed from a plurality of transversely aligned, spaced apart filaments arranged to filter contaminants from the inlet air.

Opposing first and second attachment members respectively secure the proximal and distal edges to the exterior surface so as to apply a tension force to the screen mesh which holds the top and bottom contact surfaces in direct contacting abutment against the exterior surface. This advantageously eliminates the need for one or more mechanical fasteners along the top and bottom edges.

These and various other features and advantages which characterize the claimed invention will become apparent upon reading the following detailed description and upon reviewing the associated drawings.

DETAILED DESCRIPTION

Figure 1:
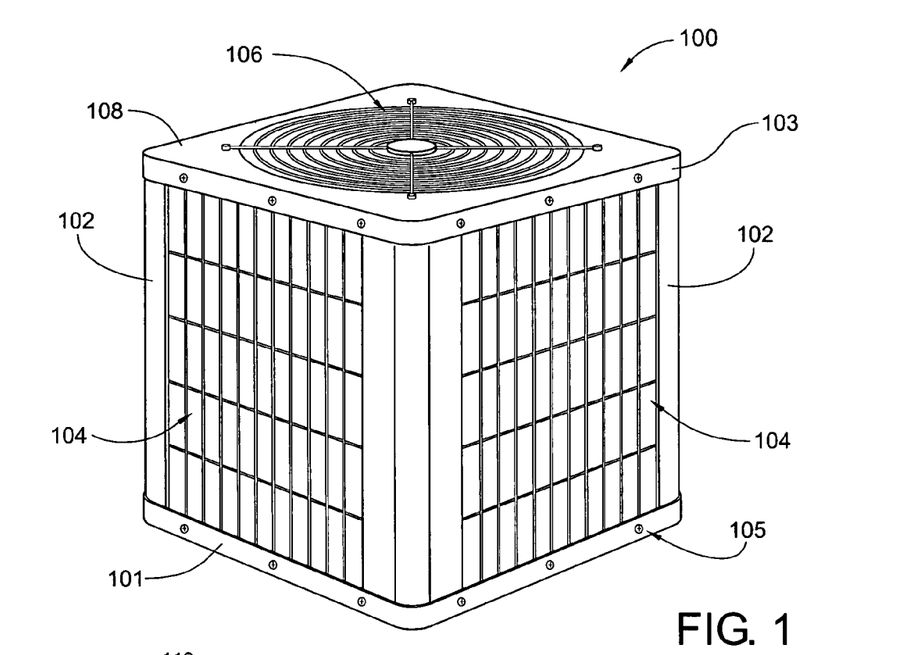
FIG. 1 is an isometric view of an air processing unit of the related art suitable for use in conjunction with preferred embodiments of the present invention.

To illustrate an exemplary environment in which presently preferred embodiments of the present invention can be advantageously practiced, FIG. 1 shows an HVAC air processing unit 100 of the type configured to exchange heat with the surrounding air environment.

The unit 100 preferably includes a number of conventionally known features, including a bottom pan 101 supporting an interior mounted compressor and a top pan 103 that supports an interior mounted fan. Sidewalls (not numerically designated) extend between the bottom and top pans 101, 103 to provide a circumferentially extending exterior surface 102 having inlet apertures 104. The sidewalls are attached to the pans 101, 103 using a plurality of fasteners 105. For purposes herein, it will be understood that the exterior surface 102 preferably includes the sidewalls as well as the vertically extending portions of the pans 101, 103 through which the fasteners 105 extend, although such is not limiting.

Inlet air is drawn through the apertures 104 by the fan. The inlet air passes adjacent internal cooling fins and coils to effect the heat transfer. The outlet exhaust air is vented through an aperture 106 located on a top surface 108 of the top pan 103.

Figure 2:
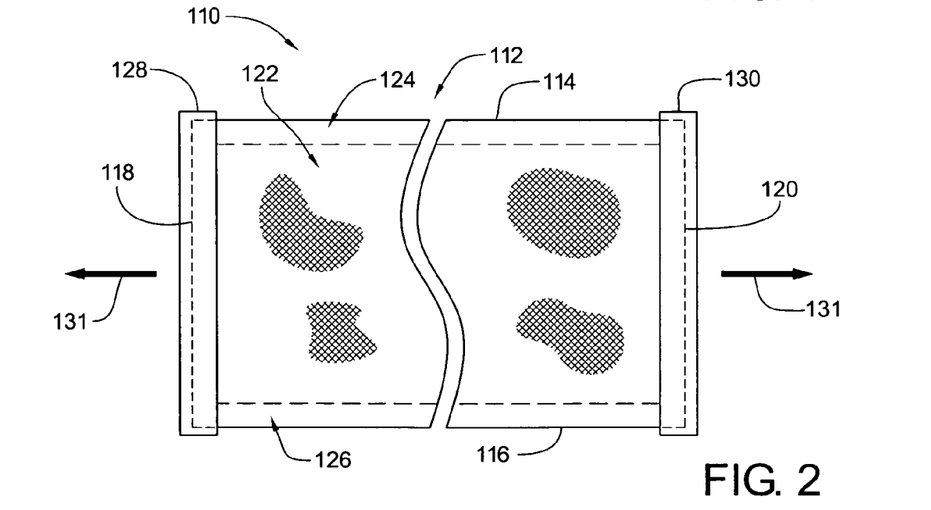
FIG. 2 is a side elevational view of a screen assembly adapted for use with the air processing unit of FIG. 1 in accordance with preferred embodiments.

FIG. 2 shows a screen assembly 110 adapted for use with the unit 100 to reduce the ingress of airborne particulate debris into the unit. The screen assembly 110 generally includes a substantially rectilinear screen mesh 112 having opposing top and bottom edges 114, 116 and opposing proximal and distal edges 118, 120. These respective edges define an inner contact surface area 122 sized to accommodate the exterior surface 102 of the unit 100 (e.g., preferably all four sides of the unit). Top and bottom contact surfaces (bounded by broken lines at 124, 126) laterally extend adjacent to and along the respective extents of the top and bottom edges.

The screen mesh 112 is preferably formed of a plurality of spaced apart metal, fiberglass or plastic filaments that extend in transverse directions in a known fashion. Preferably, adjacent filaments are separated by a distance that is equal or less than a distance between adjacent cooling fins within the unit 100 so that the filaments serve to block the ingress of contaminants that would otherwise be too large to pass freely between adjacent fins. A particularly suitable spacing for adjacent filaments is contemplated as being on the order of about $\frac{1}{16}^{th}$ to about $\frac{1}{25}^{th}$ of an inch, although other spacing sizes can be used as desired.

The screen assembly 110 further includes opposing first and second attachment members 128, 130 which respectively secure the proximal and distal edges 118, 120 to the exterior surface 102 so as to apply a tension force to the screen mesh 112, as depicted by opposing arrows 131. This tension force 131 serves to seal the top and bottom contact surfaces 124, 126 in flush contacting abutment against the exterior surface 102 (above and below the apertures 104, FIG. 1) along the lengths of the surfaces 124, 126.

This provides effective, respective seals therebetween and eliminates the need for the use of one or more mechanical fasteners along the top and bottom edges of the mesh. The mesh 112 in tension easily flexes and distorts to absorb small irregularities in the exterior surface 102, such as the screw heads of the fasteners 105.

Figure 3:
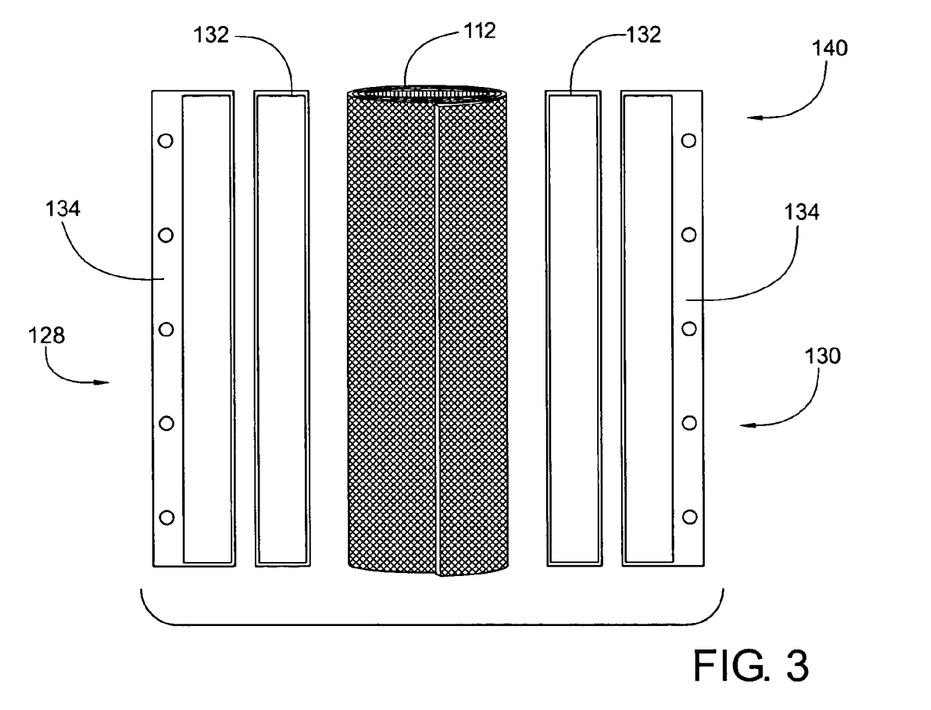
FIG. 3 illustrates a kit from which the screen assembly of FIG. 2 can be advantageously formed.

FIG. 3 illustrates a kit 140 comprising an arrangement of parts from which the screen assembly 110 is formed by the end user in accordance with preferred embodiments. A roll of the screen mesh 112 is initially provided along with the aforementioned first and second attachment members 128, 130, each of which include an inner attachment strip 132 and an outer attachment strip 134. The inner attachment strip 132 is configured to be attached to the exterior surface 102 and the outer attachment strip 134 configured to attach to the associated inner attachment strip 132 and sandwich the proximal and distal edges 118, 120 therebetween.

Figure 4:
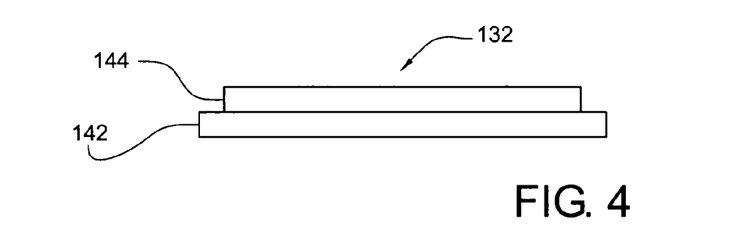
FIG. 4 provides a side elevational view of an inner strip attachment portion of the kit of FIG. 3.
Figure 5:
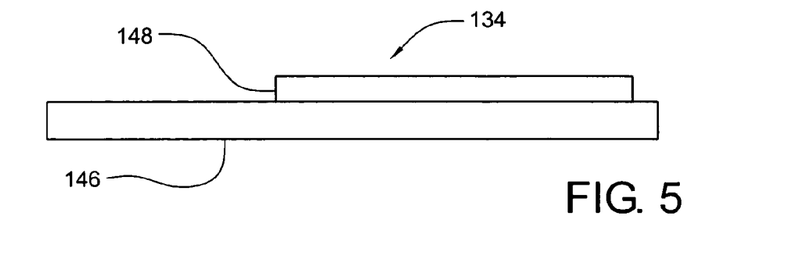
FIG. 5 provides a side elevational view of an outer strip attachment portion of the kit of FIG. 3.
Figure 6:
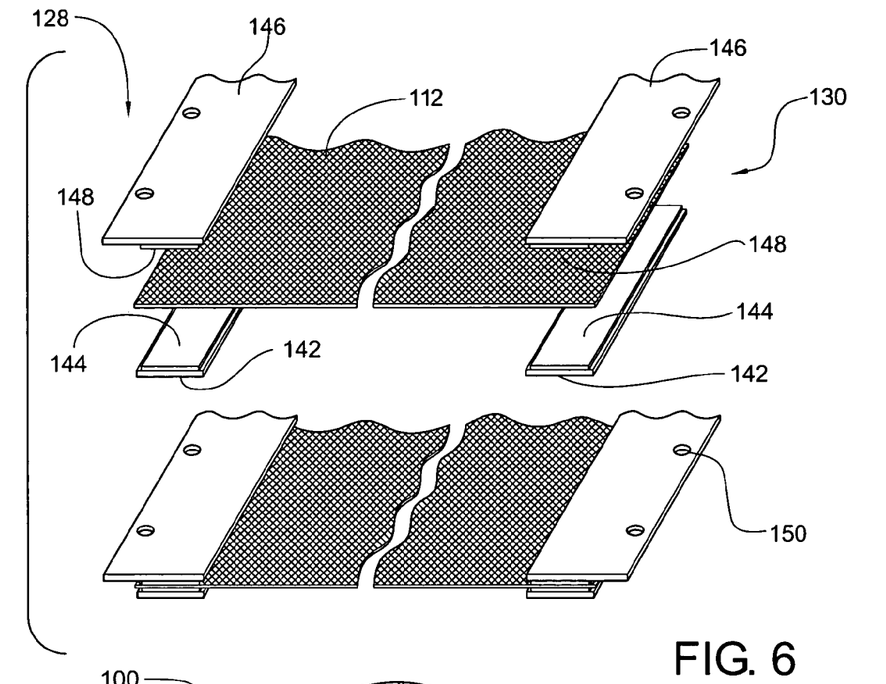
FIG. 6 illustrates a preferred manner in which the screen assembly of FIG. 2 is formed from the kit of FIG. 3.

FIG. 4 shows each of the inner attachment strips 132 to preferably comprise a flexible magnetic strip 142 and a layer of adhesive 144 (such as pressure sensitive adhesive, PSA). As further shown in FIG. 5, each of the outer attachment strips 134 preferably comprises a rigid plate 146 and a second layer of adhesive 148. The inner and outer attachment strips 132, 134 are preferably arranged such that the respective adhesive layers 144, 148 engage the edges 118, 120 of the screen, as depicted in FIG. 6.

Preferably, each of the adhesive layers 144, 148 are additionally configured to extend through the gaps between adjacent filaments to contactingly engage the remaining layer "through" the screen 112. This provides an improved securing force upon the screen mesh 112. The plates 146 are preferably sized so as to provide a cantilevered flange with respect to the adhesive layers 144, 148 and the magnetic strip 142, as best viewed in FIG. 6. When installed, this forms a channel defined by said flange, the associated inner strip and the exterior surface of the air processing unit that provides clearance for elastic cords or similar mechanisms to engage apertures 150 in the plates to better secure the screen assembly 110 to the unit 100. This channel also facilitates the ability of a user to readily grasp and remove the attachment members 128, 130 from the unit 100.

Note that the rigid plates 146 serve to significantly increase both the shear force and the perpendicular force required to remove the magnetic strips 142 from the unit 100; that is, without the rigid plates 146, the flexible magnetic strips 142 could be readily peeled away from the unit with little effort, whereas with the rigid plates 146 the strength of the entire length of each magnetic strip 142 is consolidated and braced so that the entire magnetic strip 142 must be removed at once.

This provides significantly improved retention of the screen assembly 110 onto the unit 100. The bracing provided by the rigid plates 146 further serve to increase the ability of the magnetic strips 142 to retain tension force 136 upon the mesh 112 by resisting localized sliding or deformation by the strips.

Figure 7:
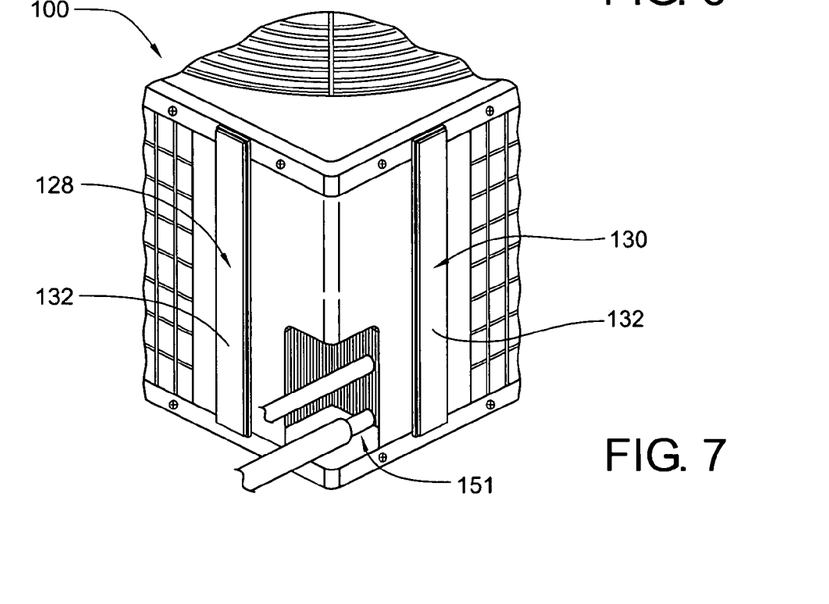
FIG. 7 shows the unit of FIG. 1 in conjunction with the inner strip attachment portions of FIG. 4 attached thereto.

FIGS. 7-10 illustrate a preferred sequence for assembling the kit 140 of FIG. 3 to provide the screen assembly 120 of FIG. 2 onto the unit 100 of FIG. 1. In FIG. 7, the inner attachment strips 132 of the attachment members 128, 130 are attached to suitable locations on the unit, preferably adjacent and on opposing sides of conduits 151 used to permit ingress and/or egress of the cooling fluid.

It is contemplated that the kit 140 will have overall dimensions sized to accommodate a variety of differently sized units 100, allowing the individual components to be trimmed, using scissors or the like, to appropriate dimensions either before or after attachment to the unit 100. Accordingly, the configuration of FIG. 7 can be obtained by first attaching the members 128, 130 and then trimming the same, or by measuring the height of the unit 100, trimming the members 128, 130 and then attaching the trimmed members to the unit 100.

Figure 8:
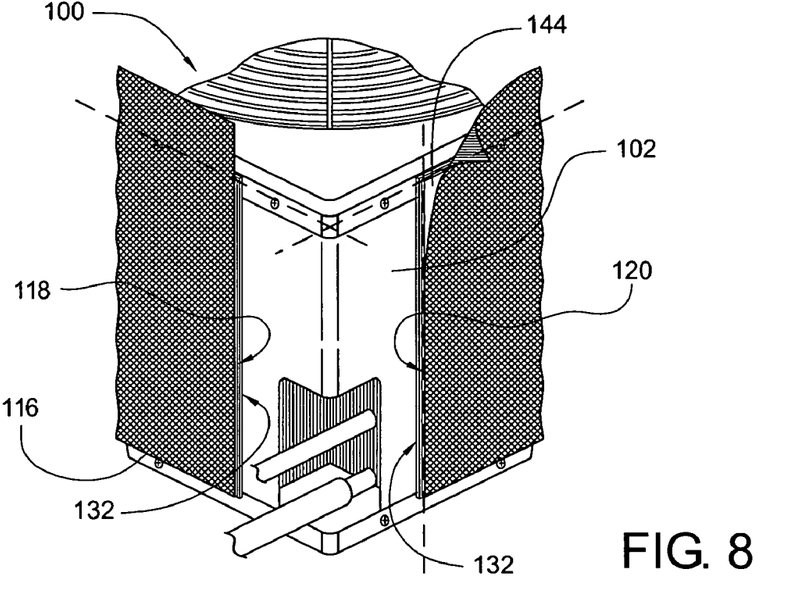
FIG. 8 depicts the arrangement of FIG. 7 with the addition of the screen material from the kit of FIG. 3.

In FIG. 8, the screen mesh 112 is next applied to the unit 100 such that the proximal end 118 is aligned with the first inner attachment strip 132 of the member 128. Preferably, the bottom edge 116 of the screen mesh 112 is directed so as to run parallel adjacent the bottom of the unit and the proximal edge 118 is aligned with the adhesive layer 144 of the first attachment member 128. Alternately, the bottom edge 116 can extend below the bottom of the unit 100 and be trimmed later as described for the top edge 114.

The screen mesh 112 is then wrapped around the exterior surfaces 102 of the unit 100 and the distal edge 120 pressed onto the adhesive layer 148 of the second inner attachment strip 132 of the attachment member 130. While the height and width of the screen mesh 112 can be trimmed prior to this step, it is contemplated that an easier installation approach involves wrapping the screen mesh 112 in this fashion and then trimming the mesh as needed along one or more edges to provide the configuration depicted by FIG. 8 (in an "unpeeled" state without the corner peeled back).

Preferably, the screen mesh 112 is only initially lightly pressed onto the layers of adhesive 144, 148 which allows the mesh to be lifted off, adjusted and replaced in position until the top and bottom contact surfaces 124, 126 (FIG. 2) are in flush contacting abutment against the exterior surfaces 102 around the circumference of the unit 100. At this point the proximal edge 118 of the screen mesh 112 is pressed firmly against the adhesive layer 144 of the inner attachment strip 132 of the first attachment member 128, the screen mesh 112 is pulled taut to apply the aforementioned tension force 132 (FIG. 2), and the distal edge 120 of the screen mesh 112 is pressed firmly against the adhesive layer 148 of the inner attachment strip 132 of the second attachment member 130.

Figure 9:
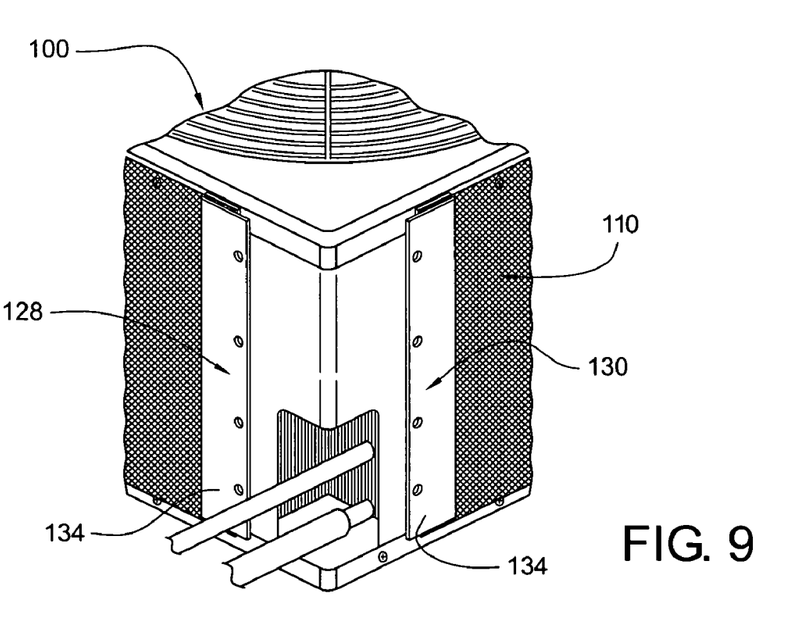
FIG. 9 shows the arrangement of FIG. 8 with the addition of the outer strip attachment portions of FIG. 5 attached thereto to complete the screen assembly.
Figure 10:
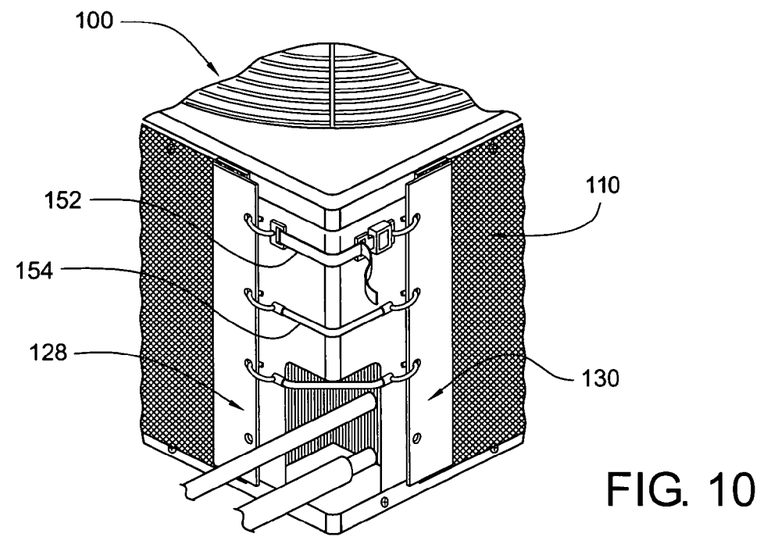
FIG. 10 shows the arrangement of FIG. 9 along with the optional use of one or more adjustable straps or elastic cords (e.g., bungee cords) to further secure the screen assembly to the unit.

Continuing with FIG. 9, the next step preferably comprises placement of the outer attachment strips 134 onto the screen mesh 112 directly over the inner attachment strips 132 to complete the attachment members 128, 130 and the screen assembly 110. Firm pressure is then applied along the entire length of each strip 134 to press the adhesive layers 148 through the screen mesh 112 to contactingly engage the adhesive layers 144 on the inner attachment strips 132 below and entrapping the screen mesh 112 therebetween. As desired, adjustable straps 152 or elastic cords (such as bungee cords) 154 can be further added as shown in FIG. 10 to engage and thereby secure the first and second attachment members 128, 130 together and maintain the tension force 131.

While the foregoing discussion contemplated the use of magnetic strips 142 to secure the attachment members 128, 130 to the unit 100, such is not necessarily limiting; rather, any number of other attachment mechanisms such as hook and loop fasteners, adhesive, etc. can readily be used to replace the magnetic strips 142 as desired. Alternately, the screen assembly 110 may be effectively secured to the air processing unit 100 with only the adjustable straps 152 or elastic cords 154 as depicted in FIG. 10 without the use of magnetic strips, hook and loop fasteners, adhesive, etc.

Figure 11:
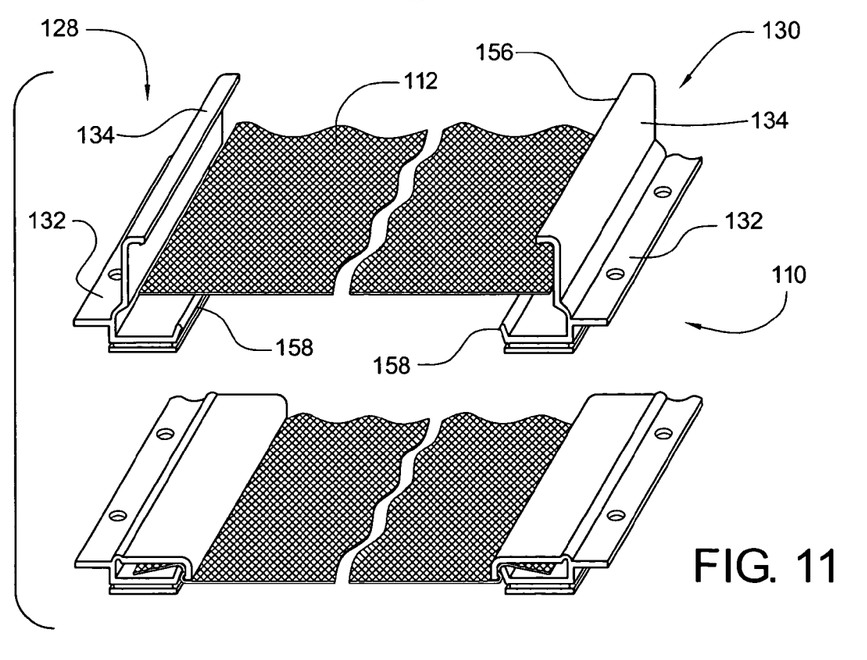
FIG. 11 illustrates an alternative preferred embodiment for the kit of FIG. 3 which utilizes a snapping action to secure the proximal and distal ends of the screen.

Similarly, other configurations for the first and second attachment strips 128, 130 are readily envisioned besides that presented above. For example, FIG. 11 shows the screen assembly 110 which utilizes an interlocking arrangement wherein attachment members 128,130 are comprised of a hinged rigid plate 134 with a locking edge 156 that engages a corresponding flange 158 on the bottom plate 132 to secure the respective edges 118, 120 of the screen mesh 112 therebetween. The members 128, 130 in FIG. 11 can be formed using any number of suitable processes including injection molding or extrusion.

Figure 12:
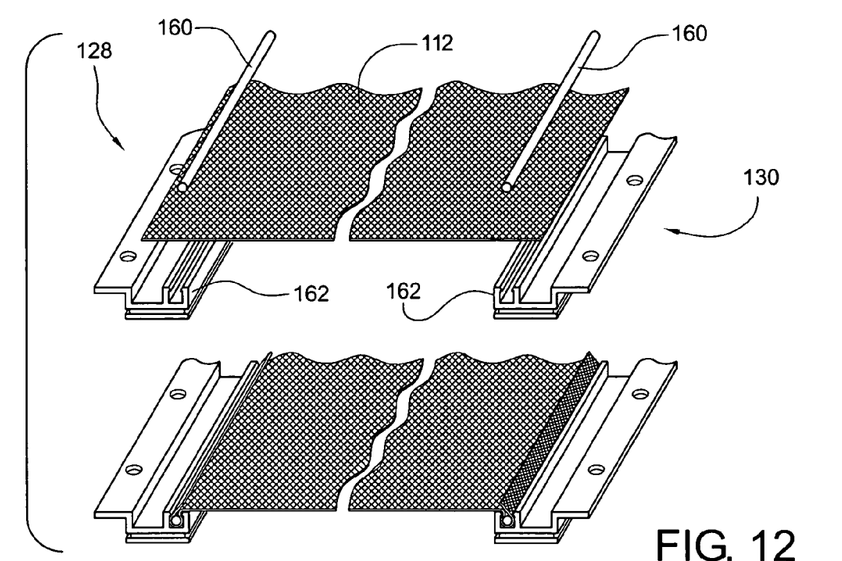
FIG. 12 illustrates another alternative preferred embodiment for the kit of FIG. 3 in which a locking rod is used to secure the proximal and distal ends of the screen.
Figure 13:
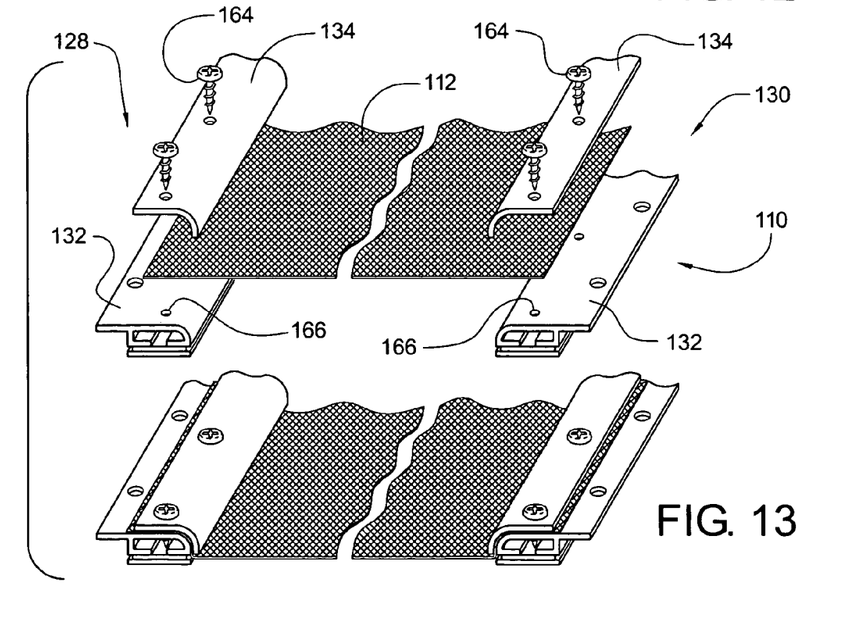
FIG. 13 illustrates another alternative preferred embodiment for the kit of FIG. 3 which utilizes fasteners to secure the proximal and distal ends of the screen.

FIG. 12 provides another preferred embodiment wherein an elongated, cylindrical locking rod 160 is inserted into a corresponding channel 162 to secure the associated edges 118, 120 of the screen mesh 112 therebetween. FIG. 13 provides yet another preferred embodiment wherein threaded fasteners 164 engage corresponding apertures 166 to clamp the associated edges 118, 120 between the inner and outer attachment strips 132, 134. The particular materials utilized will depend on the requirements of a given application, but are contemplated as preferably comprising suitable plastics or metals suitable for exposure to the elements.

Figure 14:
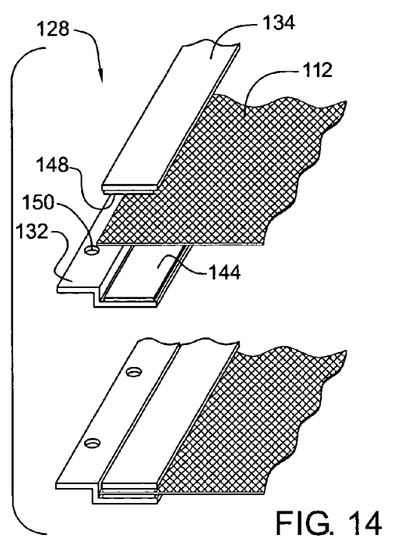
FIG. 14 illustrates another alternative preferred embodiment for the kit of FIG. 3 in which the inner strip attachment portions each have a generally z-shaped configuration and each is attached to the unit via adjustable straps or elastic cords.

FIG. 14 provides an alternative preferred embodiment for the kit of FIG. 3. In this embodiment, the inner attachment strips 132 are formed of relatively rigid material, such as plastic, and are provided with a generally z-shaped configuration to provide a cantilevered flange to provide a clearance channel as discussed above. The strips 132 are preferably secured to the unit 100 using the aforementioned adjustable straps 152 or elastic cords 154 (FIG. 10).

Figure 15:
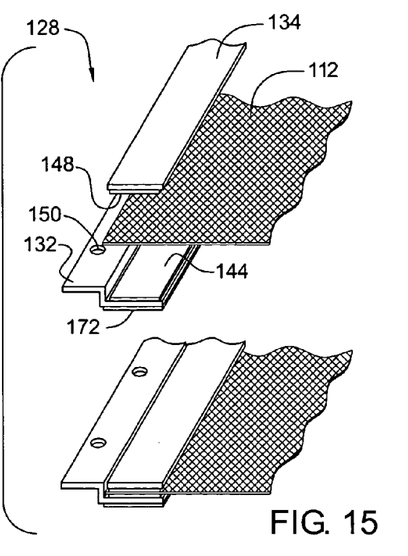
FIG. 15 illustrates a related alternative preferred embodiment to that shown in FIG. 14 with the addition of magnetic strips for attachment to the unit.

FIG. 15 illustrates a related embodiment to that shown in FIG. 14. In FIG. 15, magnetic strips 172 are affixed to the undersides of the z-shaped inner attachment strips 132 to facilitate attachment to the unit 100. Straps or cords 152, 154 can additionally be used as desired.

Figure 16:
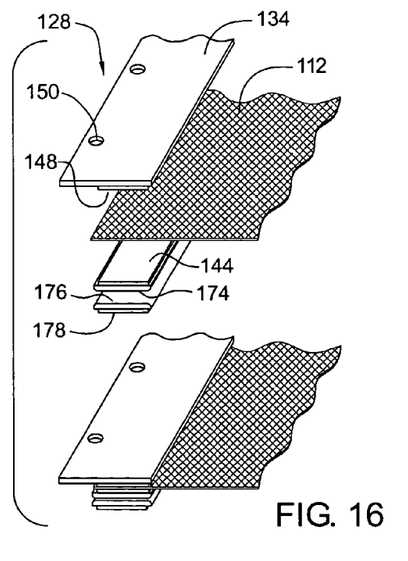
FIG. 16 illustrates another alternative preferred embodiment for the kit of FIG. 3 in which hook and loop fasteners are used to secure the inner strip attachment portions to the unit.

FIG. 16 presents another preferred embodiment which employs hook and loop fasteners such as the type commercially available from Velcro USA, Manchester, N.H., USA. Adhesive layer 144 is bonded to a hook member 174. The hook member 174 mates with a corresponding loop member 176 secured to the unit 100 via a layer of adhesive 178. In this way, the screen assembly 110 can be readily attached and removed from the unit 100 through engagement and disengagement of the hook and loop members 174, 176. Hook and loop attachment strips can readily be substituted for the magnetic strips in all of the preferred embodiments shown in FIGS. 6, 11, 12 and 13 and are considered to be interchangeable means of attachment. The advantages of the rigid attachment members 128, 130 are even more evident when hook and loop fasteners are used because each member can be securely attached with as little as two 1" long strips (or less) and still apply the requisite tension force on the screen mesh 112.

Figure 17:
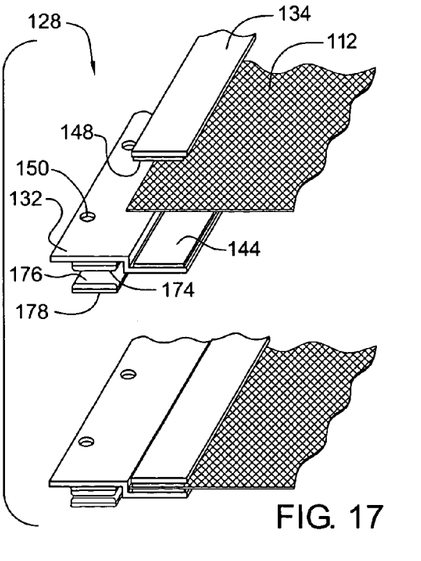
FIG. 17 illustrates another alternative preferred embodiment for the kit of FIG. 3 with z-shaped inner strip attachment portions and hook and loop fasteners.

FIG. 17 shows another preferred embodiment which combines the z-shaped inner attachment strips 132 of FIGS. 14 and 15 with the hook and loop fasteners of FIG. 16. In this embodiment, each z-shaped inner attachment strips 132 nests the hook and loop members 174, 176 under the cantilevered flange. A layer of adhesive 180 affixes the hook member 174 to the underside of the flange.

Figure 18:
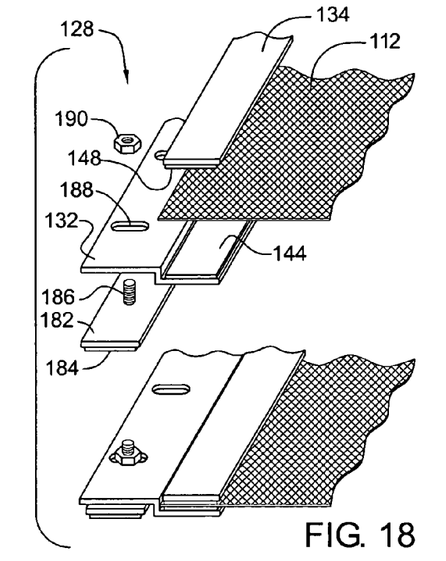
FIG. 18 illustrates another alternative preferred embodiment for the kit of FIG. 3 in which threaded standoffs are used to secure the proximal and distal ends of the screen.

FIG. 18 illustrates another preferred embodiment for the kit of FIG. 3. A base plate 182 is preferably affixed to the unit 100 using a layer of adhesive 184. One or more threaded standoffs 186 project upwardly from the base plate 182 to mate with a corresponding number of apertures 188 in the z-shaped inner attachment strip 132. A nut 190 or similar mechanism engages each standoff 188 to secure the inner attachment strip 132 to the base plate 182, and hence to the unit 100. Other types of standoffs can readily be utilized as well, such as deformable clips, snaps, etc. As desired, the apertures 188 can be elongated as shown in FIG. 18 to allow tension adjustment to the screen assembly 110. Additional holes can be added to allow attachment of the aforementioned straps or cords 152, 154, as desired.

Figure 19:
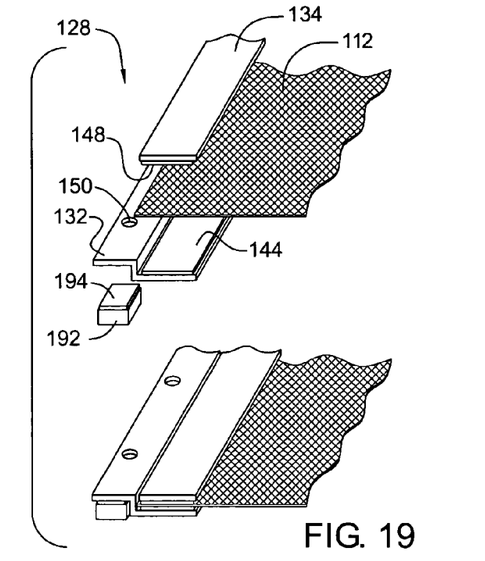
FIG. 19 illustrates another alternative preferred embodiment for the kit of FIG. 3 with z-shaped inner strip attachment portions with nesting attachment blocks.

FIG. 19 provides yet another embodiment which employs an attachment block 192 which is preferably affixed to the underside of the cantilevered flange of the inner attachment strip 132 via a layer of adhesive 194. Preferably, the attachment block 192 comprises a magnet, although other constructions can be utilized as well. The block 192 is preferably sized to nest within the channel formed between the unit 100 and the flange. Two ore more blocks could be used on each strip 132.

Figure 20:
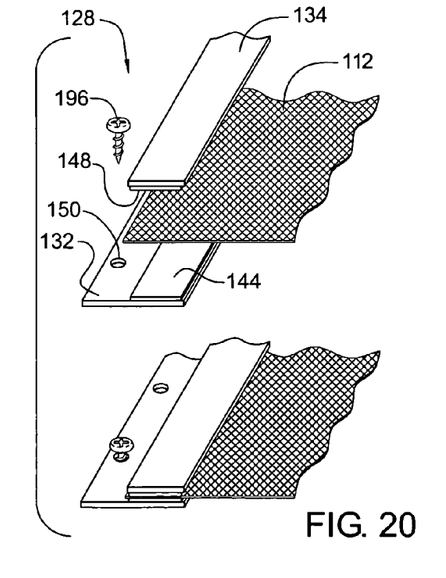
FIG. 20 illustrates another alternative preferred embodiment for the kit of FIG. 3 in which threaded fasteners are used to secure the inner strip attachment portions to the unit.
Figure 21:
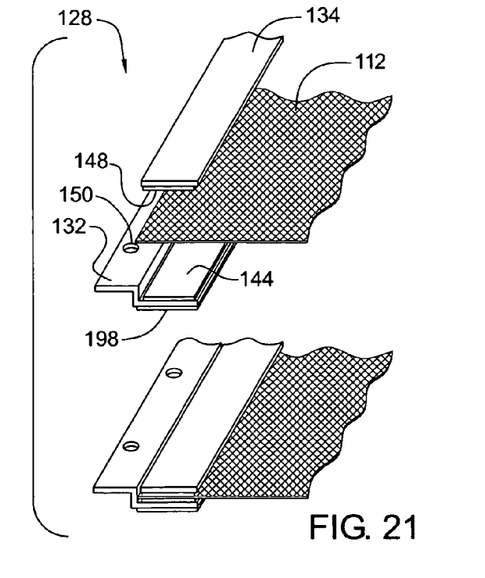
FIG. 21 illustrates another alternative preferred embodiment for the kit of FIG. 3 in which z-shaped inner strip attachment portions are secured to the unit via adhesive strips.

FIG. 20 provides another preferred embodiment for the kit of FIG. 3. In this embodiment, threaded fasteners 196 extend through the apertures 150 in the inner attachment strip 132 and into the unit 100 to secure the screen assembly 110 to the unit. Finally, FIG. 21 provides another embodiment similar to that set forth by FIG. 15 except that a layer of adhesive 198 is used to affix the inner attachment strip 132 to the unit 100. As before, straps or cords 152, 154 can additionally be used with any of the aforedescribed embodiments as desired.

For purposes of the appended claims, the recited "first means" will be understood to correspond to the disclosed first and second attachment members 128, 130 as variously embodied in FIGS. 2-21. Structures that employ additional fasteners along the top and bottom edges of the screen mesh to secure the associated contact surfaces to the exterior surface of the unit are not encompassed by this limitation and are explicitly excluded from the definition of an equivalent.

The recited "engaging means" will be understood to correspond to the disclosed adjustable straps 152 and elastic cords (such as bungee cords) 154 shown in FIG. 10, as well as any number of different rigid or flexible tether type structures such as but not limited to ropes, chains, twine, or longitudinally extending threaded fasteners that engage and thereby secure the first and second attachment members 128, 130 together and maintain the tension force 131.

The term "roll" will be understood consistent with the foregoing discussion to describe an arrangement of the recited screen mesh in a non-planar arrangement, such as but not limited to a rolled, folded, or bunched condition.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the screen assembly without departing from the spirit and scope of the present invention.

What is claimed is:

1. A screen assembly for filtering intake air passing through an exterior surface of an air processing unit, comprising:
    a substantially rectilinear screen mesh having opposing top and bottom edges, opposing proximal and distal edges, and top and bottom contact surfaces which laterally extend along the respective extents of the top and bottom edges; and
    opposing first and second attachment members adapted to respectively secure the proximal and distal edges to the exterior surface so as to apply a tension force to the screen mesh which holds the top and bottom contact surfaces in direct contacting abutment against the exterior surface to form respective seals therebetween without requiring the use of one or more mechanical fasteners along the top and bottom edges.

2. The screen assembly of claim 1, wherein the intake air provides a drawing force upon the screen mesh during operation of the air processing unit which cooperates with the tension force to contactingly bias the top and bottom contact surfaces against the exterior surface.

3. The screen assembly of claim 1, wherein at least a selected one of the first and second attachment members comprises a flexible magnetic strip which extends along the length of the associated proximal and distal edge of the screen to attach said edge to the exterior surface.

4. The screen assembly of claim 3, wherein the remaining one of the first and second attachment members also comprises a flexible magnetic strip which extends along the length of the associated edge of the screen to attach said edge to the exterior surface.

5. The screen assembly of claim 1, wherein the first and second attachment members each comprise a longitudinally extending outer strip attachable to an outer planar surface of the screen and a longitudinally extending inner strip attachable to an inner planar surface of the screen so that the respective proximal and distal edges are sandwiched between the respective inner and outer strips.

6. The screen assembly of claim 5, wherein each of the inner strips comprises a flexible strip.

7. The screen assembly of claim 5, wherein each of the outer strips comprises a rigid plate.

8. The screen assembly of claim 5, wherein at least a selected one of the inner and outer strips comprises a flange which projects beyond the respective edge of the screen to form a channel defined by said flange and the exterior surface of the air processing unit.

9. The screen assembly of claim 5, wherein each of the first and second attachment members each further comprise a layer of adhesive on the outer strip and a layer of adhesive on the inner strip configured such that when the screen is sandwiched between the respective outer and inner strips, the respective layers of adhesive meet through openings in the screen mesh to permanently affix the respective first and second attachment members to the respective proximal and distal edges of the screen.

10. The screen assembly of claim 1, wherein the air processing unit comprises a coil with heat exchanging transfer fins spaced apart by a first nominal distance, wherein the screen mesh comprises a plurality of transversely arrayed filaments that form openings therebetween, and wherein adjacent ones of said filaments are spaced apart by a second nominal distance less than the first nominal distance.

11. The screen assembly of claim 1, wherein at least a selected one of the first and second attachment members comprises a hinged member which engages a corresponding flange to secure the associated edge of the screen mesh.

12. The screen assembly of claim 1, wherein at least a selected one of the first and second attachment members comprises an elongated rod which engages a corresponding locking channel to secure the associated edge of the screen mesh.

13. The screen assembly of claim 1, wherein at least a selected one of the first and second attachment members comprises an upper plate and a lower plate, and wherein at least one fastener is inserted through the upper plate and into the lower plate to secure the associated edge of the screen mesh.

14. The screen assembly of claim 1, further comprising engaging means for engaging the first and second attachment members to secure said members together.

15. The screen assembly of claim 1, wherein the first and second attachment members each comprise a longitudinally extending outer strip and a substantially z-shaped inner strip, and wherein the respective proximal and distal edges are sandwiched between the respective inner and outer strips.

16. The screen assembly of claim 15, wherein each of the substantially z-shaped inner strips comprises a cantilevered flange that forms a channel with the exterior surface.

17. The screen assembly of claim 16, wherein the first and second attachment members each further comprise a base plate that nests within the channel, the base plate supporting an upwardly projecting standoff used to secure the cantilevered flange to the exterior surface.

18. The screen assembly of claim 16, wherein the first and second attachment members each further comprise an attachment block that nests within the channel, the attachment block securing the cantilevered flange to the exterior surface.

19. The screen assembly of claim 1, wherein the first and second attachment members each comprise a longitudinally extending outer strip and a longitudinally extending inner strip, wherein the respective proximal and distal edges are sandwiched between the respective inner and outer strips, and wherein a threaded fastener secures a selected one of the inner and outer strips to the exterior surface.

20. The screen assembly of claim 1, wherein the first and second attachment members are affixed to the exterior surface using respective layers of adhesive.

21. The screen assembly of claim 1, wherein the first and second attachment members are affixed to the exterior surface using hook and loop fasteners.

22. The screen assembly of claim 1 arranged as a disassembled kit configured for subsequent assembly into an article of manufacture.

23. An apparatus, comprising:
a substantially rectilinear screen mesh having opposing top and bottom edges, opposing proximal and distal edges, and top and bottom contact surfaces which laterally extend along the respective extents of the top and bottom edges; and
first means for attaching the screen mesh to an exterior surface of an air processing unit so as to apply a tension force to the screen mesh which holds the top and bottom contact surfaces in direct contacting abutment against the exterior surface without requiring the use of one or more mechanical fasteners along the top and bottom edges.

24. A kit comprising:
a roll of rectilinear screen mesh having opposing top and bottom edges, opposing proximal and distal edges, and top and bottom contact surfaces which laterally extend along the respective extents of the top and bottom edges; and
opposing first and second attachment members adapted for attachment to said screen mesh when the screen mesh is in an unrolled condition so as to respectively secure the proximal and distal edges to an exterior surface of an air processing unit and apply a tension force to the screen mesh, said force adapted to seal the top and bottom contact surfaces in direct contacting abutment against the exterior surface without requiring the use of one or more mechanical fasteners along the top and bottom edges.

25. The kit of claim 24, wherein at least a selected one of the first and second attachment members comprises a flexible magnetic strip which extends along the length of the associated proximal and distal edge of the screen to attach said edge to the exterior surface.

26. The kit of claim 25, wherein the remaining one of the first and second attachment members also comprises a flexible magnetic strip which extends along the length of the associated edge of the screen to attach said edge to the exterior surface.

27. The kit of claim 24, wherein the first and second attachment members each comprise a longitudinally extending outer strip attachable to an outer planar surface of the screen and a longitudinally extending inner strip attachable to an inner planar surface of the screen so that the respective proximal and distal edges are sandwiched between the respective inner and outer strips.

28. The kit of claim 27, wherein each of the inner strips comprises a flexible strip.

29. The kit of claim 27, wherein each of the outer strips comprises a rigid plate.

30. The kit of claim 29, wherein each of the rigid plates comprises a flange which projects beyond the respective edge of the screen to form a channel defined by said flange, the associated inner strip and the exterior surface of the air processing unit.

31. The kit of claim 27, wherein each of the first and second attachment members each further comprise a layer of adhesive on the outer strip and a layer of adhesive on the inner strip configured such that when the screen is sandwiched between the respective outer and inner strips, the respective layers of adhesive meet through openings in the screen mesh to permanently affix the respective first and second attachment members to the respective proximal and distal edges of the screen.

32. The kit of claim 24, wherein at least a selected one of the first and second attachment members comprises a hinged member which engages a corresponding flange to secure the associated edge of the screen mesh.

33. The kit of claim 24, wherein at least a selected one of the first and second attachment members comprises an elongated rod which engages a corresponding locking channel to secure the associated edge of the screen mesh.

34. The kit of claim 24, wherein at least a selected one of the first and second attachment members comprises an upper plate and a lower plate, and wherein at least one fastener is inserted through the upper plate and into the lower plate to secure the associated edge of the screen mesh.

35. The kit of claim 24, wherein the first and second attachment members each comprise a longitudinally extending outer strip and a substantially z-shaped inner strip, and wherein the respective proximal and distal edges are sandwiched between the respective inner and outer strips.

36. The kit of claim 35, wherein each of the substantially z-shaped inner strips comprises a cantilevered flange that forms a channel with the exterior surface.

37. The kit of claim 36, wherein the first and second attachment members each further comprise a base plate that nests within the channel, the base plate supporting an upwardly projecting standoff used to secure the cantilevered flange to the exterior surface.

38. The kit of claim 36, wherein the first and second attachment members each further comprise an attachment block that nests within the channel, the attachment block securing the cantilevered flange to the exterior surface.

39. The kit of claim 24, wherein the first and second attachment members each comprise a longitudinally extending outer strip and a longitudinally extending inner strip, wherein the respective proximal and distal edges are sandwiched between the respective inner and outer strips, and wherein a threaded fastener secures a selected one of the inner and outer strips to the exterior surface.

40. The kit of claim 24, wherein the first and second attachment members are affixed to the exterior surface using respective layers of adhesive.

41. The kit of claim 24, wherein the first and second attachment members are affixed to the exterior surface using hook and loop fasteners.

42. A method comprising:
providing a substantially rectilinear screen mesh having opposing top and bottom edges, opposing proximal and distal edges, and top and bottom contact surfaces which laterally extend along the respective extents of the top and bottom edges;
using a first attachment member to secure the proximal edge to the exterior surface at a first location thereon; and using a second attachment member to secure the distal edge to an exterior surface at a second location thereon so as to apply a tension force to the screen mesh which seals the top and bottom contact surfaces in direct, flush contacting abutment against the exterior surface without the use of one or more mechanical fasteners along the top and bottom edges.

43. The method of claim 42, wherein the using a first attachment member step comprises applying an inner attachment strip to the exterior surface at the first location, affixing the proximal edge of the screen mesh to the inner attachment strip, and applying an outer attachment strip to the inner attachment strip to sandwich the screen mesh therebetween.

44. The method of claim 42, wherein the using a second attachment member step comprises applying an inner attachment strip to the exterior surface at the second location, affixing the distal edge of the screen mesh to the inner attachment strip, and applying an outer attachment strip to the inner attachment strip to sandwich the screen mesh therebetween.

45. The method of claim 42, further comprising directing the screen mesh adjacent an intermediary portion of the exterior surface after the using the first attachment member step and prior to the using the second attachment member step.

46. The method of claim 42, wherein the directing step further comprises trimming the screen to a dimension associated with the exterior surface.

* * * * *